(12) United States Patent
Borwankar

(10) Patent No.: US 6,594,693 B1
(45) Date of Patent: Jul. 15, 2003

(54) METHOD AND APPARATUS FOR A STRUCTURED, SYNCHRONIZED CONVERSATION USING ELECTRONIC MESSAGES OVER A COMPUTER NETWORK

(76) Inventor: Nitin A. Borwankar, 5543A Fremont St., Oakland, CA (US) 94608

( * ) Notice: Subject to any disclaimer, the term of this patent is extended or adjusted under 35 U.S.C. 154(b) by 0 days.

(21) Appl. No.: 09/235,174

(22) Filed: Jan. 22, 1999

Related U.S. Application Data

(60) Provisional application No. 60/074,185, filed on Feb. 10, 1998.

(51) Int. Cl.[7] .............................................. G06F 15/16
(52) U.S. Cl. ..................... 709/219; 709/203; 709/204; 709/206; 709/217
(58) Field of Search ................................. 709/217, 218, 709/219, 203, 230, 232, 206

(56) References Cited

U.S. PATENT DOCUMENTS 5,937,164 A * 8/1999 Mages et al. .......... 395/200.48

OTHER PUBLICATIONS

Dokko et al., "Development of Multimedia E–mail System Providing an Integrated Message View", IEEE, p. 494–498, 1997.*

Carrier et al., "Practical Multimedia Electronic Mail on X.400", IEEE, pp. 12–23, 1995.*

* cited by examiner

*Primary Examiner*—David Wiley
*Assistant Examiner*—Joseph E Avellino

(57) ABSTRACT

Methods, apparatus, and computer program products are disclosed for having an electronic online conference among multiple clients over a computer network. A method of sending and receiving conference or conversation messages over a computer network is described. The conference messages are sent from and by a computer network client and are not posted to a conference server. This is done according to an Internet e-mail protocol in which messages are synchronized among a defined group of conversation participants. The Internet e-mail protocol is SMTP or ESMTP, and the messages are sent and received in MIME format. A MIME conversation message includes data specifying at least one of the following actions: initiate the conversation, respond to an invitation, post a conversation message to the conversation, initiate a topic in the conversation, initiate a sub-conversation within the conversation, terminate the topic, terminate the sub-conversation, and terminate the conversation, invite a late participant, delete an existing participant, and provide a conversation history to the late participant. The conversation messages are synchronized by automatically storing all messages in the conversation at a client computer in a message store organized according to a history of the conversation.

8 Claims, 16 Drawing Sheets

METHOD AND APPARATUS FOR A STRUCTURED, SYNCHRONIZED CONVERSATION USING ELECTRONIC MESSAGES OVER A COMPUTER NETWORK

CROSS-REFERENCE TO RELATED APPLICATION

This application claims the benefit of U.S. Provisional Application No. 60/074,185, filed Feb. 10, 1998, which is incorporated herein by reference in its entirety.

BACKGROUND OF THE INVENTION

1. Field of the Invention

The present invention relates generally to software for computer network-oriented applications. In particular, it relates to group conversation software using electronic mail features over computer networks.

2. Discussion of Related Art

The predominant software applications that allow users to have ongoing, online conversations or group discussions using electronic mail are typically server-based applications. These applications are generally software packages that enable ongoing conversations or conferences only among participants subscribing to a dedicated network application server. This server is typically owned and operated by a private entity for the purpose of enabling its users or employees to have online discussions or conferences using software running on the server and on client machines.

One commonly used application is known as Lotus Notes™ available from IBM Corp. of Armonk, N.Y. Lotus Notes is a server-based software application that allows users, also referred to as clients in this context, to conduct meetings or conferences online via electronic messages using an application server running Lotus Notes and Lotus Notes software running on client machines. Generally, Lotus Notes is a file system-based application in which clients are given access to a dedicated Lotus Notes server.

FIG. 1a is a schematic diagram showing a generic server-based, online conferencing application running on two networks. Each participating client typically has the proprietary software required to enable it to communicate with an application server to participate in a conference or online discussion. In FIG. 1a clients 100 and 102 on networks 104 and 106 are participating in an online conference using an electronic conferencing application, such as Lotus Notes. When client 102 sends a conference message to client 100, the message is first routed to an application server 108, such as a Lotus Notes server, along message path 110. The message from client 102 is posted on server 108 and will then be replicated onto a second server application server 112. Similarly, conference participants on another network participating in the same conference as clients 100 and 102 will have their messages posted to their local application server and replicated on other servers. Thus, if participants on different networks using separate servers are participating in the same conference, the servers would have to be frequently synchronized or updated of each other's messages for the discussion to at least appear that it is taking place in real time. However, application servers of this type are generally synchronized and replicated once a day. Thus, a participant in one network typically will see a message posted to a server by a participant on another network the following day. This type of coordination of servers (often there are multiple servers) requires significant network overhead and is ill-suited for conversations in which participants require fairly quick responses, or in which participants are geographically distributed over multiple servers worldwide Returning to FIG. 1a, once the servers have been synchronized over an inter-network connection 114, the message is transmitted to client 100 and any other clients on network 104 participating in the same conference.

Another feature of these types of online conferences is that they are not initiated by a conference participant but rather by an application administrator, for example, a Lotus Notes administrator. Thus, in addition to the large overhead required in synchronizing the servers, such applications are restrictive in terms of administration and the ability to initiate a conversation. As alluded to above, online conferencing applications are also restrictive in terms of scope in that the domain of eligible participants is the group of clients who subscribe to the application server and have the application software resident on their computers. These factors, in addition to the time delay from infrequent server replication, are not conducive to having unencumbered, ongoing discussions that require reasonably quick responses and draw in participants from outside a private organization or company. The above is also true of a non-proprietary technology referred to as USENET. USENET, however, is cross-company but suffers from the problem that all conversations are completely public. E-mail list servers allow private, limited membership but still require administration and lack confidentiality.

Another proprietary server-based online conferencing application in the same category as Lotus Notes is Convene™ available from Convene of San Francisco, Calif. Convene is also a server-based application that uses a dial-up frame work that requires participants to subscribe to the Convene service in order to participate in online meetings, analogous to conversations or conferences in Lotus Notes. Like Lotus Notes, Convene is not an Internet e-mail based application. (Lotus Notes allows for sub-conferences that have their own topics to exist within the context of a conference.) Thus, Convene is a service in which a participant must dial up, through a modem for example, or subscribe to the service in order to participate in online meetings between participants on separate networks. All participants in a Convene server-based conversation must be on a single server. Thus, with Convene there is no server-to-server message replication.

Outside the category of proprietary products such as Convene and Lotus Notes, another method of sending messages to a group of participants on a network is through the use of a conventional e-mail alias. An alias, in this context, is essentially a name that identifies a group of recipients. They are commonly used on internal (i.e. within a company or organization) e-mail applications and for e-mail on the Internet. Essentially, before the message is sent, the system interprets the alias and determines all the users and their addresses in that alias. However, once the e-mail is received, the recipients can typically perform one of several actions on that message, such as deleting it or forwarding it to other users (some who may have already been defined in the original sender's alias). Thus, by using e-mail aliases, the sender of the e-mail loses control of the message once it is received by the other users. There is no mechanism to maintain the history and context of a conversation in a form available to all members of the conversation.

With respect to e-mail transmitted over the Internet (i.e. the worldwide public network based on the Internet Protocol), the relationship between a sender and a receiver is typically one-to-one in that the sender transmits an e-mail message to a particular recipient. FIG. 1b is a schematic diagram showing two clients on two separate networks in which one client is sending an Internet e-mail message to the other. A client 116 on a local area computer network 118 sends an e-mail message to a client 120 on local area computer network 122. The message is sent through a Internet server 124 on network 118 and received by a similar server 126 on network 122. The e-mail message is transmitted over the Internet 128 over a one-to-one message path 130. Of course, it is also not uncommon for a sender to transmit a message to several recipients, which can be done using an alias as discussed above.

The opposite of this type of relationship is the USENET system that runs over the Internet in which a sender can transmit or post a message to a USENET server which, in turn, posts it to other USENET servers, thereby making the message available to a mass audience having access to the USENET servers. As with e-mail aliases discussed above, this type of relationship with a wide, undefined recipient pool makes any type of control and structure over a dialogue among Internet users nearly impossible.

Therefore, it would be desirable to have a group messaging application that provides structure and persistence, and allows users from a global domain to participate in unfettered, ongoing conversations or conferences in close to real time without the intervention of a server or administrator. This would allow for practical and meaningful group conversations over any type of network, including the Internet.

SUMMARY OF THE INVENTION

According to the present invention, methods, apparatus, and computer program products are disclosed for having an electronic online conference among multiple clients over a computer network. In one aspect of the invention, a method of sending and receiving conference or conversation messages over a computer network is described. The conference messages are sent from and by a computer network client and without posting the conference messages to a network server. This is done according to an Internet e-mail protocol in which messages are synchronized among a defined group of conversation participants.

In one embodiment of the present invention, the Internet e-mail protocol is SMTP or ESMTP, and the messages are sent and received in MIME format. In another embodiment of the present invention, a MIME conversation message includes data specifying at least one of the following actions: initiate the conversation, respond to an invitation, post a conversation message to the conversation, initiate a topic in the conversation, initiate a sub-conversation within the conversation, terminate the topic, terminate the sub-conversation, and terminate the conversation, invite a late participant, delete an existing participant, and provide a conversation history to the late participant. In yet another embodiment, the conversation messages are synchronized by automatically storing all messages in the conversation at a client computer in a message store organized according to a history of the conversation. In yet another embodiment, the conversation messages are synchronized by automatically directing all messages sent by a client computer to all members of the defined group of conversation participants.

In another aspect of the present invention, a computer program product for specifying a conversation message in a synchronized conversation over a computer network is described. A MIME formatted conversation message is stored on a computer readable medium and includes one or more MIME headers, at least one of which specifies the synchronized conversation as a MIME content type. In one embodiment of the present invention, at least one of the MIME headers includes data specifying at least one of the following actions: initiate the conversation, respond to an invitation, post a conversation message to the conversation, initiate a topic in the conversation, initiate a sub-conversation within the conversation, terminate the topic, terminate the sub-conversation, and terminate the conversation, invite a late participant, delete an existing participant, and provide a conversation history to the late participant.

In another aspect of the present invention, a message in a format allowing dissemination to one or more participants joined in a conversation stored on a computer-readable medium is described. The format includes a conversation header indicating the content of the message as a conversation. Also included is a conversation name tag containing the name of the conversation represented by the message and a unique conversation identifier tag containing a character string identifying the conversation. The format also contains a conversation topic tag containing the name of a topic within the conversation and a conversation action header signaling one or more actions taken by a participant in the conversation. A context of a conversation, the conversation represented by a message, is defined by a combination of the conversation header, conversation name tag, unique conversation identifier tag, conversation topic tag and the conversation action header. In one embodiment, the message further includes one or more body parts where each body part contains the content of the message being sent to the participants.

In another aspect of the present invention, a client-based method of conducting a structured conversation using electronic messages over a computer network is described. A conversation is initiated by sending an invitation message to each participant in an initial group of participants. An acceptance message is received from each participant in an accepting group of participants where the accepting group is either the same as the initial group or is smaller than the initial group. This creates a conversation represented by a conversation structure where the conversation structure has a domain of participants defined as the accepting group of participants and having as a creator the recipient of the acceptance message from each participant in the accepting group. At least one of the conversation messages is stored methodically according to conversation name, topic name, or delivery time. The conversation structure is stored on a client computer and is accessed by one of the participants from the accepting group. In one embodiment, general conversation information on a particular participant is methodically stored in a conversation structure such that the conversation structure resides on a client computer of the particular participant.

In yet another aspect of the present invention, a computer-based group messaging system for having spontaneous, structured conversations via electronic mail messages over the Internet and is accessible directly from within an Internet browser is described. The system includes a mail user component for controlling the storage of electronic mail messages and for accessing the Internet. A mail transfer device transmits and receives electronic mail messages over the Internet. A group messaging user interface component creates and examines an electronic mail message that is part of a conversation with other users having the same computer-based group messaging system. A group messaging engine performs functions necessary for the group messaging system by enforcing a client-interaction protocol and ensuring a structure and persistence for each electronic mail message that is part of the conversation. The group messaging user interface is directly accessible from an Internet browser contained in the mail user component, which facilitates management of electronic mail messages received by the mail transfer device and stored under the control of the mail user component of the group messaging system. In one embodiment, the group messaging engine is contained in a Web server. In another embodiment, a Web browser is accessible from the mail user component and functions as the group messaging user interface component.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A significant characteristic of the proprietary online conferencing applications discussed above is the requirement of having a server for controlling the flow of messages among participants and the initiation and termination of conferences. Messages posted to a server typically have to be replicated so they are available to participants outside a local area network, resulting in processing overhead and delays in response time. Other methods lack structure and persistence in that messages sent as part of an ongoing conversation are not stored in a consistent manner and may not reflect the history of the message (e.g. is the message a reply, if so, what was the previous message, who are the recipients, etc.).

Figure 2:
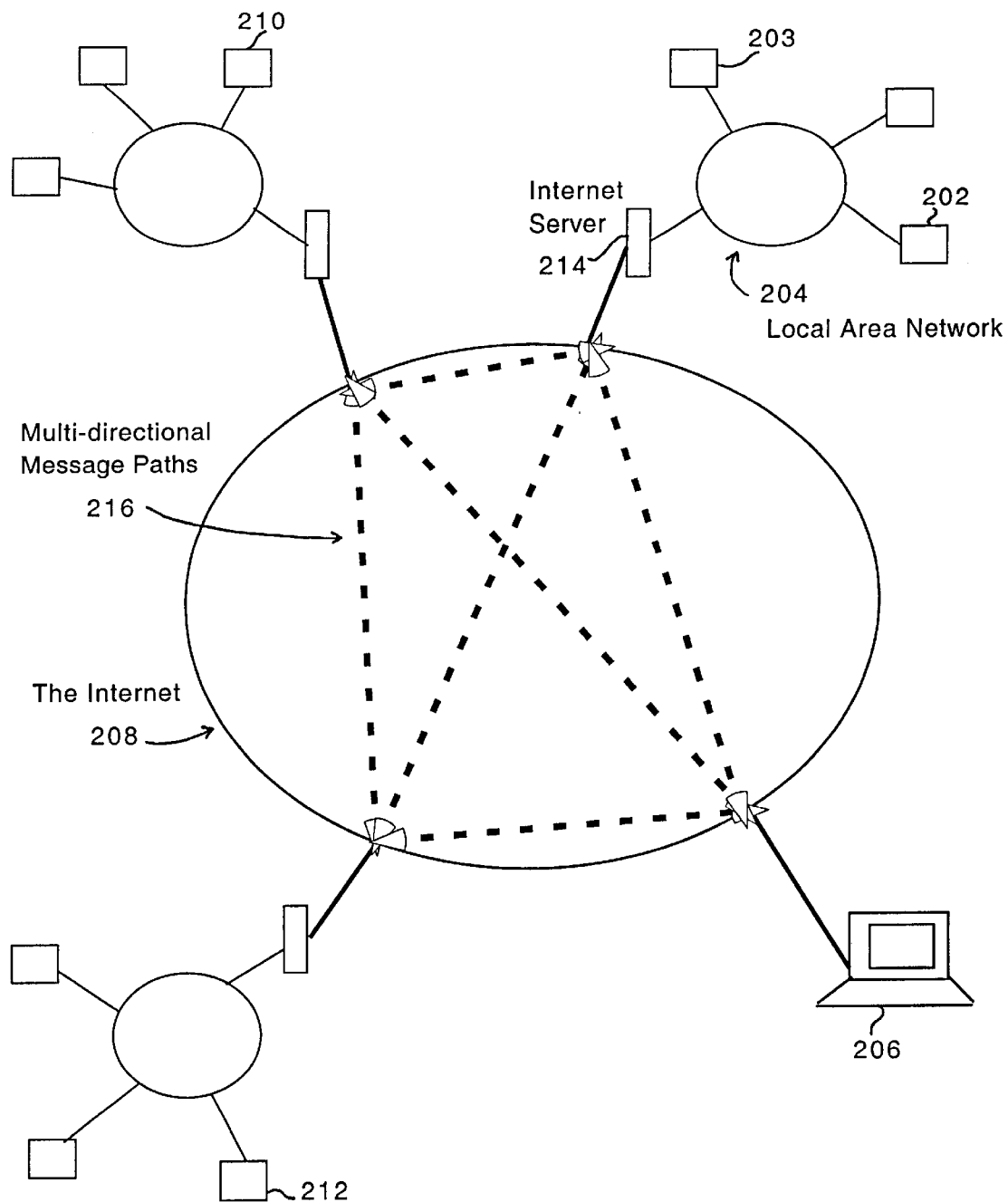
FIG. 2 is a schematic diagram of the group messaging e-mail application of the present invention showing the multi-directional message paths over the Internet.

The present invention is an online group messaging application that allows for conferences and conversations online available to a wide base of users that is client-based and has strong structure and persistence. FIG. 2 is a schematic diagram of the group messaging e-mail application of the present invention showing the multi-directional message paths over the Internet. Clients 202 and 203 in the group conversation may be users in a local area network 204 or a stand-alone client 206 such as an individual at a home with a connection to the Internet 208.

Figure 1A:
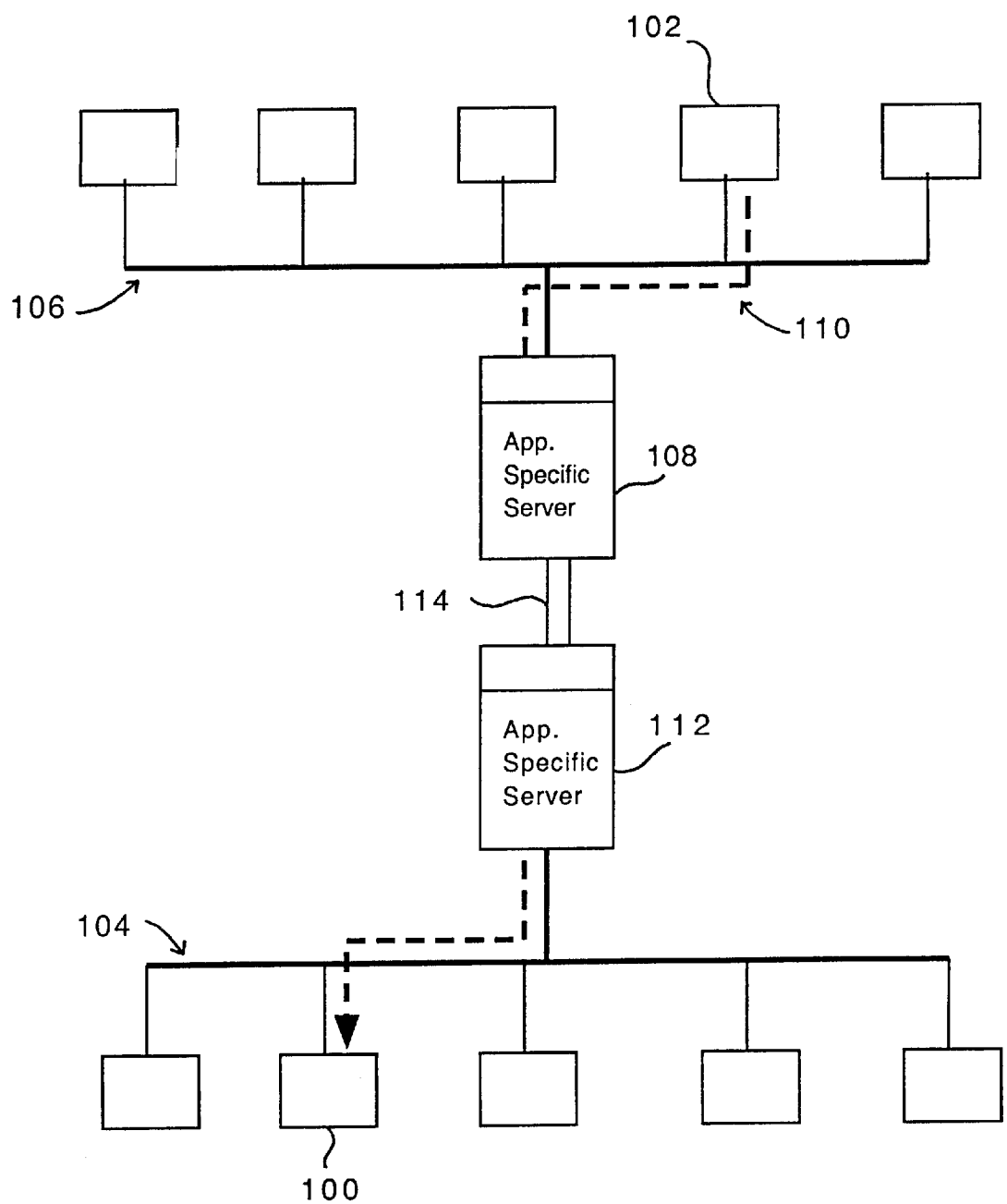
FIG. 1a is a schematic diagram showing a generic server-based, online conferencing application running on two networks.
Figure 1B:
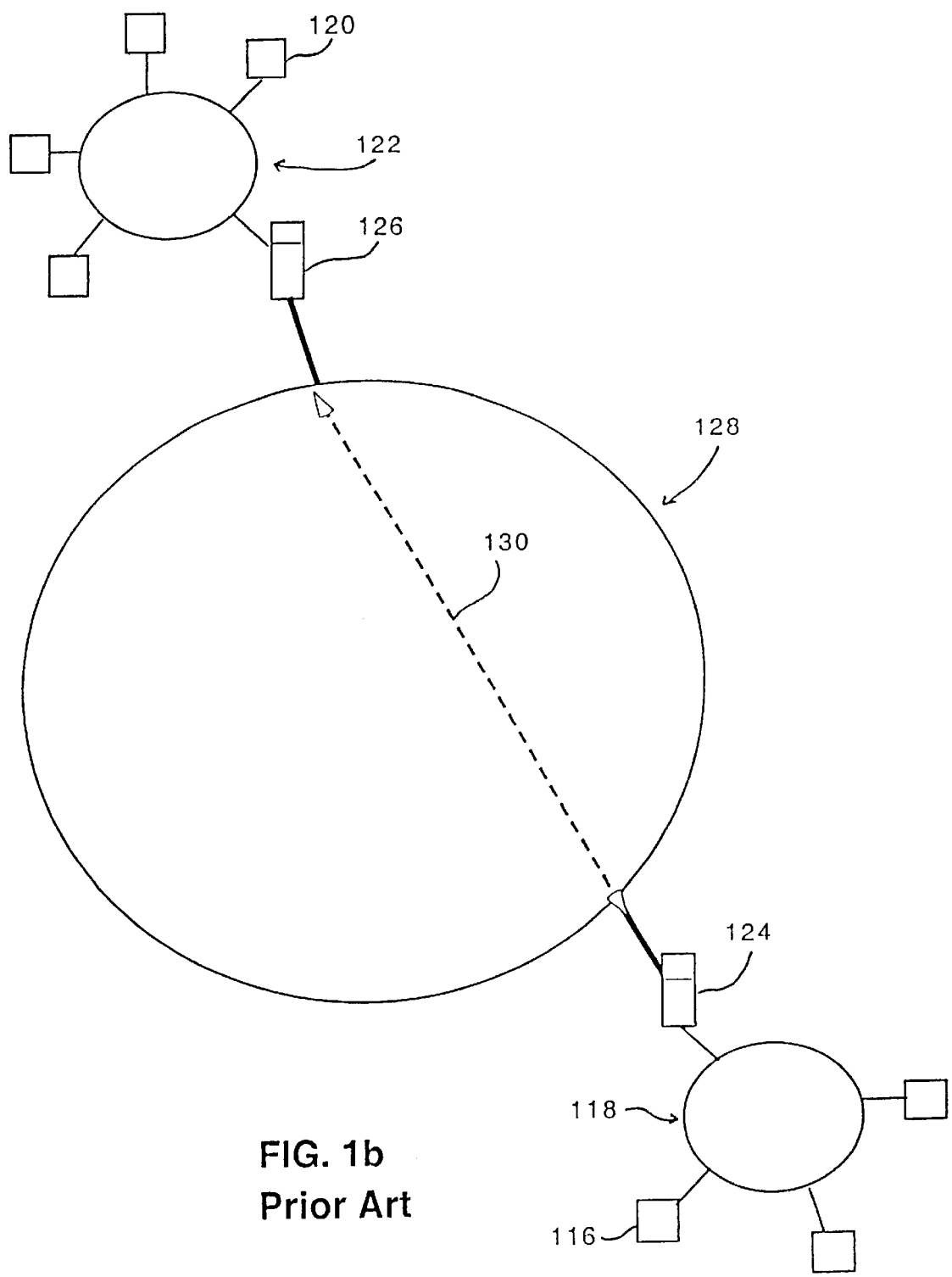
FIG. 1b is a schematic diagram showing two clients on two separate networks in which one client is sending an Internet e-mail message to the other and the one-to-one message path between the clients.

Participants 202, 203, 210 and 212 are clients participating in a group conversation from local area networks, all generally similar to network 204, whereas participant 206 is an individual participating in the same conversation but is not using any type of server. All four participants shown in FIG. 2 are having an online conversation using the software of the present invention via Internet e-mail. Thus, the only server presently needed for participants 202, 203, 210 and 212 is a server such as server 214 for managing Internet e-mail that simply allows them to send messages over the Internet. A separate application server, such as the Lotus Notes server of FIG. 1, is not required. Since participant 206 is a stand-alone user all that is required is that the stand-alone computer have the software needed to run the group messaging application and that it be able to dial on to the Internet.

Generally, the participants in a conversation may communicate over any type of computer network or communications medium. Thus, two or more participants may carry on the conversation over a LAN and other participants may carry on the conversation over the Internet. Preferably all such conversation communication are carried on via defined Internet e-mail protocols such as SMTP and ESMTP (for communication between mail transfer agents), and IMAP and POP (for communication between mail transfer agents and mail user agents). Such e-mail protocols are well known to those of skill in the art and some are described in Marshall Rose, "The Internet Message. Closing the Book on Electronic Mail," which is incorporated herein by reference for all purposes.

The Internet represented by the oval area 208 is the communication medium being used by the participants. The lines of communication among the participants are shown by dashed lines 216. In contrast to the one-to-one relationship discussed above for typical communication over the Internet, the relationship here is one-to-n, where n is the number of participants in a particular conversation.

As shown, participants in the group conversation can communicate with each other directly without having to post messages to a dedicated application server. If another participant is asked to join in the conversation, the participant only needs to have the group messaging software of the present invention and software enabling him to connect to the Internet. Because group messages among the participants in a conversation using a preferred embodiment of the present invention are sent over the Internet (and because there is no need to synchronize application servers), the messages are delivered at the same speed as e-mail is delivered over the Internet. Typically, this is significantly faster than USENET or daily LOTUS NOTES server replication.

Figure 3A:
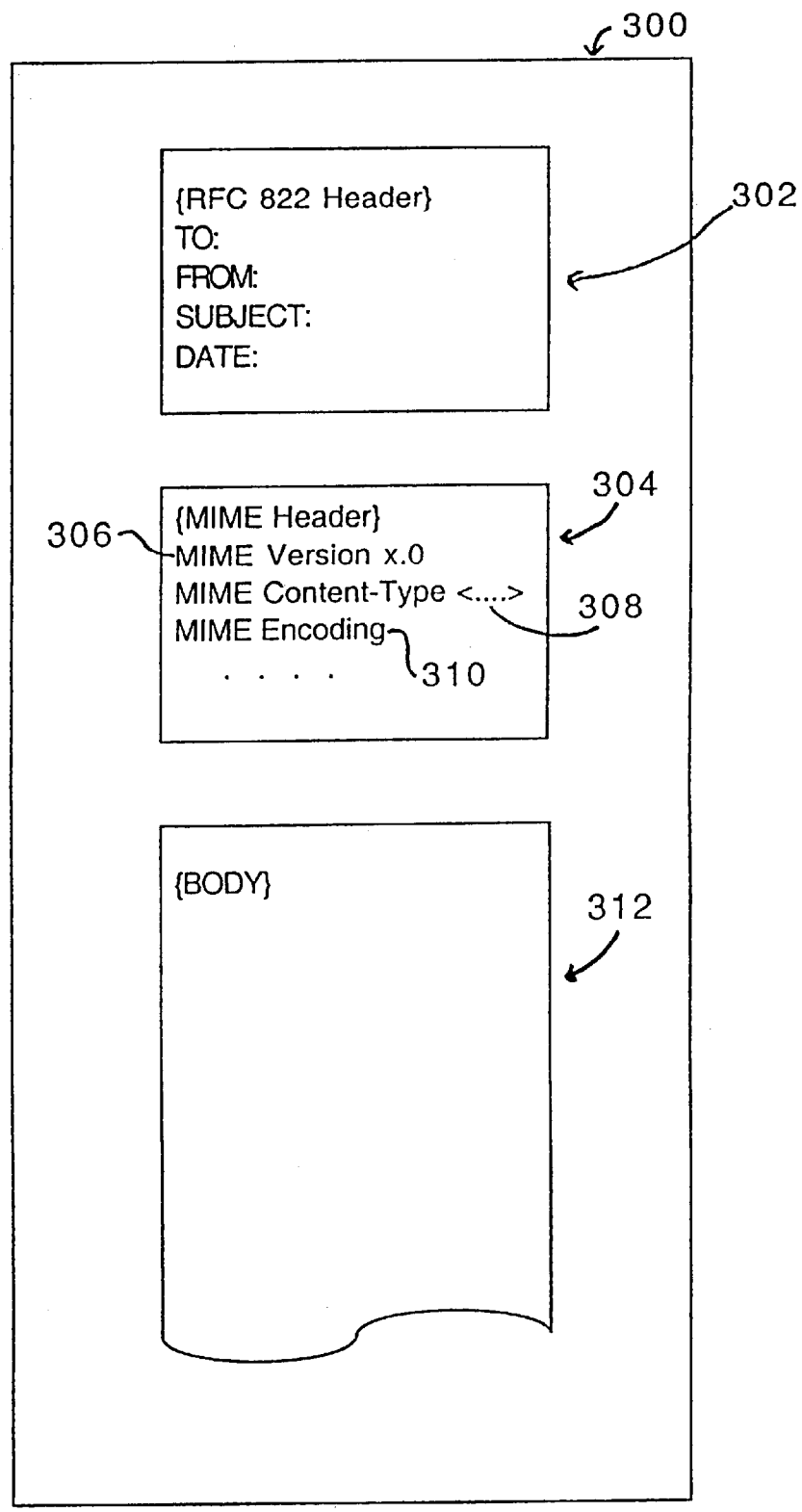
FIGS. 3a through 3c are block diagrams showing variations of the format of a typical e-mail message based on the MIME standard used over the Internet and utilized by a preferred embodiment of the present invention.
Figure 3B:
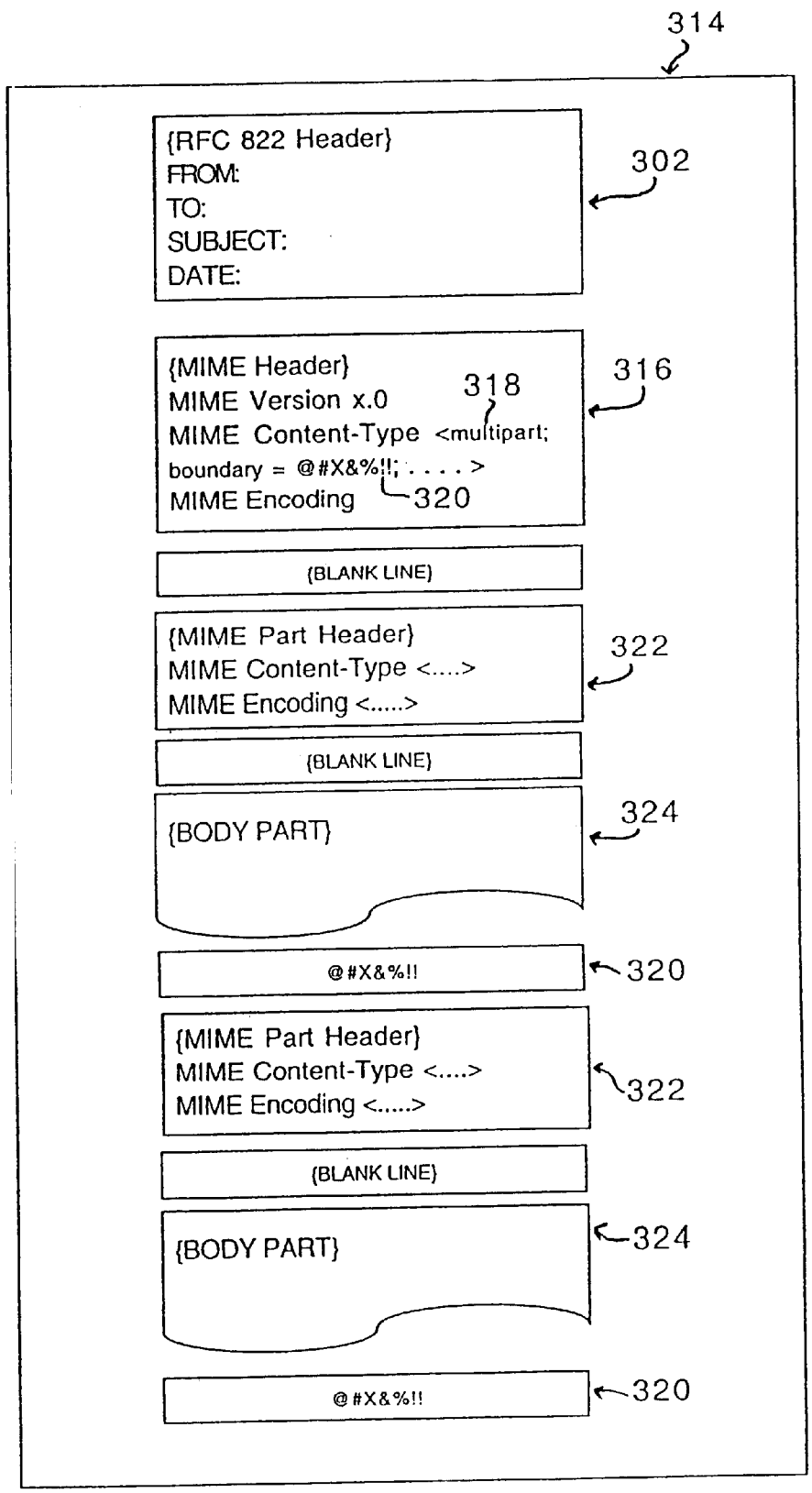
Figure 3C:
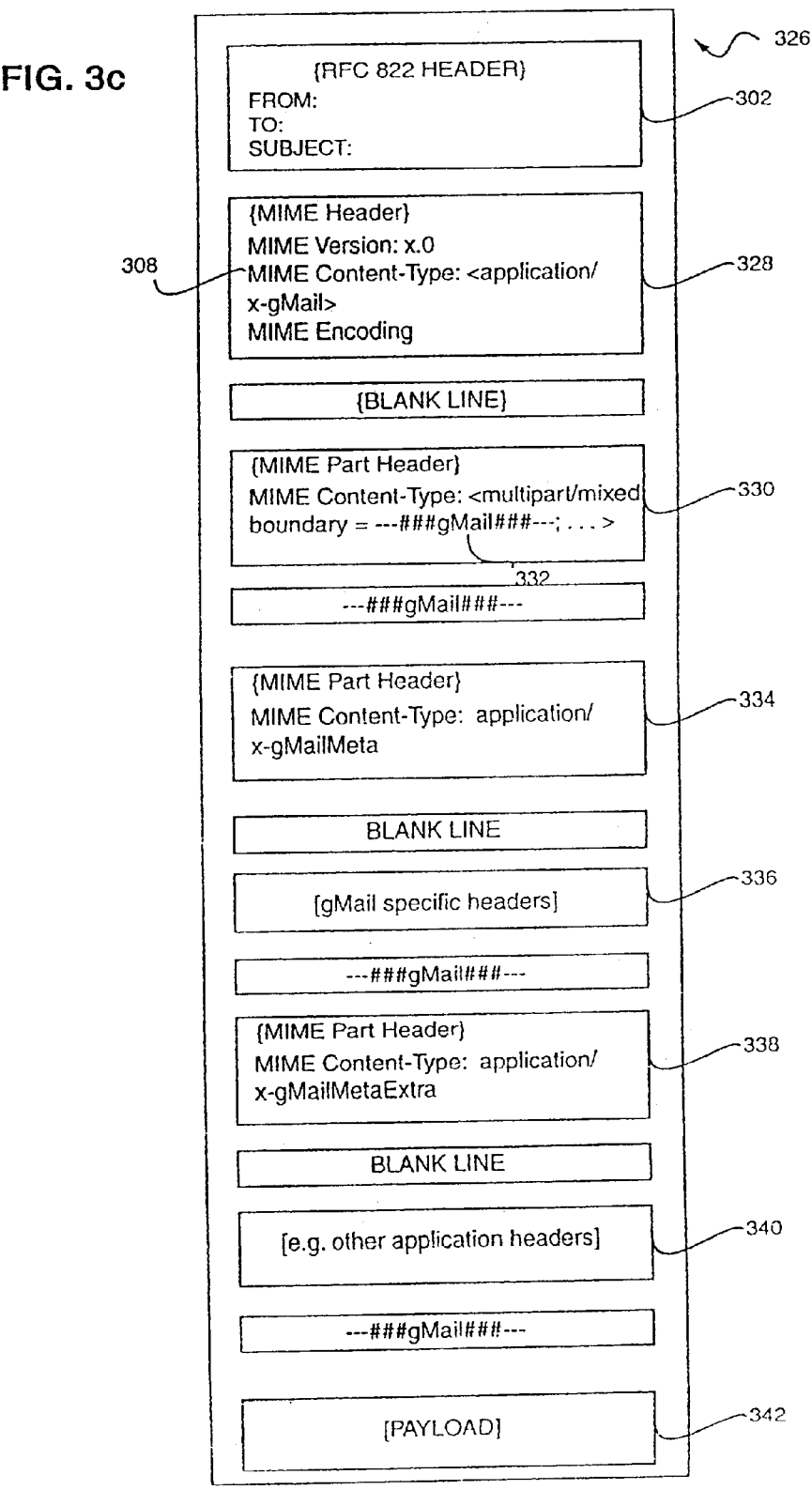

FIGS. 3a, 3b, and 3c are block diagrams showing two variations of the format of a typical e-mail message based on the MIME standard used over the Internet and utilized by a preferred embodiment of the present invention. An e-mail message 300 of FIG. 3a has a header component 302 necessary for sending an e-mail message over the Internet using the MIME format. Header 302 contains typical message fields such as To, From, Subject, and Date. Header 302 is referred to as an RFC 822 header and precedes another header component 304 known as the MIME header.

MIME header 304 requires a line 306 indicating which version of MIME is being used. Following line 306 is a MIME Content-Type line 308. MIME Content-Type line 308 indicates what type of content is contained in a body 312, discussed below, and defaults to plain/text. Lines 306 and 308 are referred to as tags, and are required for each MIME "body part." Other tags commonly used but not required are MIME Encoding tag 310 which, for example, can indicate a 7-bit, 8-bit, binary or other type of encoding. Each MIME message has a body 312 (and each body or body part has a MIME header) which contains all or part of the actual message being sent.

MIME Content-Type 308 can be one of the standard MIME types such as text/plain, text/HTML, or image/GIF. Other categories of content types are vendor-specific types and experimental types. An experimental MIME content type begins with "x-" followed the name of the content type. Experimental MIME content types are used to add tags to the MIME standard, and denote them as part of an experiment.

FIG. 3b is another block diagram of a MIME message with multiple body parts, as opposed to a message with a single body part as shown in FIG. 3a. A multi-part MIME message 314 also requires RFC 822 header 302 as shown in FIG. 3a. Following the RFC header 302 is a slightly different MIME header 316 from header 304 of FIG. 3a. MIME tag 306 of FIG. 3a (required in all MIME messages) is also present in header 316. MIME Content-Type tag 308 indicates in a first parameter 318, a multi-part MIME message. Parameter 318 is followed by a second parameter defining a boundary line 320 that separates the body parts in the MIME message. Following header 316 is a blank line, followed by a MIME Part Header 322 that provides the content type and other tags, such as encoding, for a particular body part 324 following MIME Part Header 322. Following body part 324 is boundary line 320 defined in header 316 which separates MIME body parts. As discussed with respect to FIG. 3a, a MIME content type can have as a type an experimental content type (prefaced by a "x-") in each of the body parts. Use of the experimental content type feature in MIME is discussed in greater detail below.

FIG. 3c is another block diagram of a MIME message having an application content type and a message with multiple mixed body parts. An application type MIME message 326 also requires RFC 822 header 302 as initially shown in FIG. 3a. Following header 302 is a MIME header 328 that contains a MIME Content-Type tag 308 indicating an "application/x-gMail" type MIME message which is different from a multipart MIME message as shown in FIG. 3b. Header 328, which also contains other tags such as Version and Encoding, is separated from a MIME Part Header 330, by a blank line. Header 330 has a content type indicating multipart/mixed. Thus, the single body part of message 326 contains a multipart message. In another preferred embodiment, this content type (multipart/mixed) is the default content type if it is not specified by the user. By formatting the message in this manner, gateways or other devices routing the MIME message will not know that the message is in fact a multipart message (i.e. it performs as a wrapper); they can only determine that the message is of an x-gMail application type. This is desirable because malfunctioning or poorly designed gateways often wrongly convert contents of some MIME types. However, if the content type is "application," the contents are unchanged. Thus, using an "application" type is a way of protecting against corruption by gateways.

Also indicated in the Content-Type tag is a boundary definition 332 which is used to separate the different MIME Part Headers, similar to boundary definition 320 of FIG. 3b. Following MIME Part Header 330 is another specific MIME Part Header 334 that contains a MIME Content-Type tag indicating "application/x-gMailMeta." This is followed by a blank line and a series of headers 336 specifically for gMail. In a preferred embodiment, these headers contain meta or profile data on a particular gMail conference. These include: x-gmail-conference-name, x-gmail-conference-topic, x-gmail-conference-ID, x-gmail-initiator-token, x-gmail-action, and other gMail specific headers as needed. A next MIME Part Header 338 followed by boundary 332 is similar to header 336 but in a preferred embodiment is optional. Header 338 also contains a MIME Content-Type tag indicating "application/x-gMailMetaExtra." In other preferred embodiments, names different from "gMailMetaExtra" can be used to indicated the same content type. The header is separated by a blank line from a series of headers 340 that can have different functions. For example, as shown in FIG. 3c, the headers can relate to other message formats such as Lotus Notes or USENET and can be used to translate these formats to the gMail format of the present invention. These headers can also be used to accommodate future extensions of or headers in gMail. Following headers 340 is boundary line 332 followed by the actual payload 342 of the MIME message, similar to body part 324 of FIG. 3b or part 312 of FIG. 3a. Part 342 can contain the actual text or data of the message being inserted by a user into a gMail conference or can be any other allowable body part formatted according to MIME standards.

Figure 4:
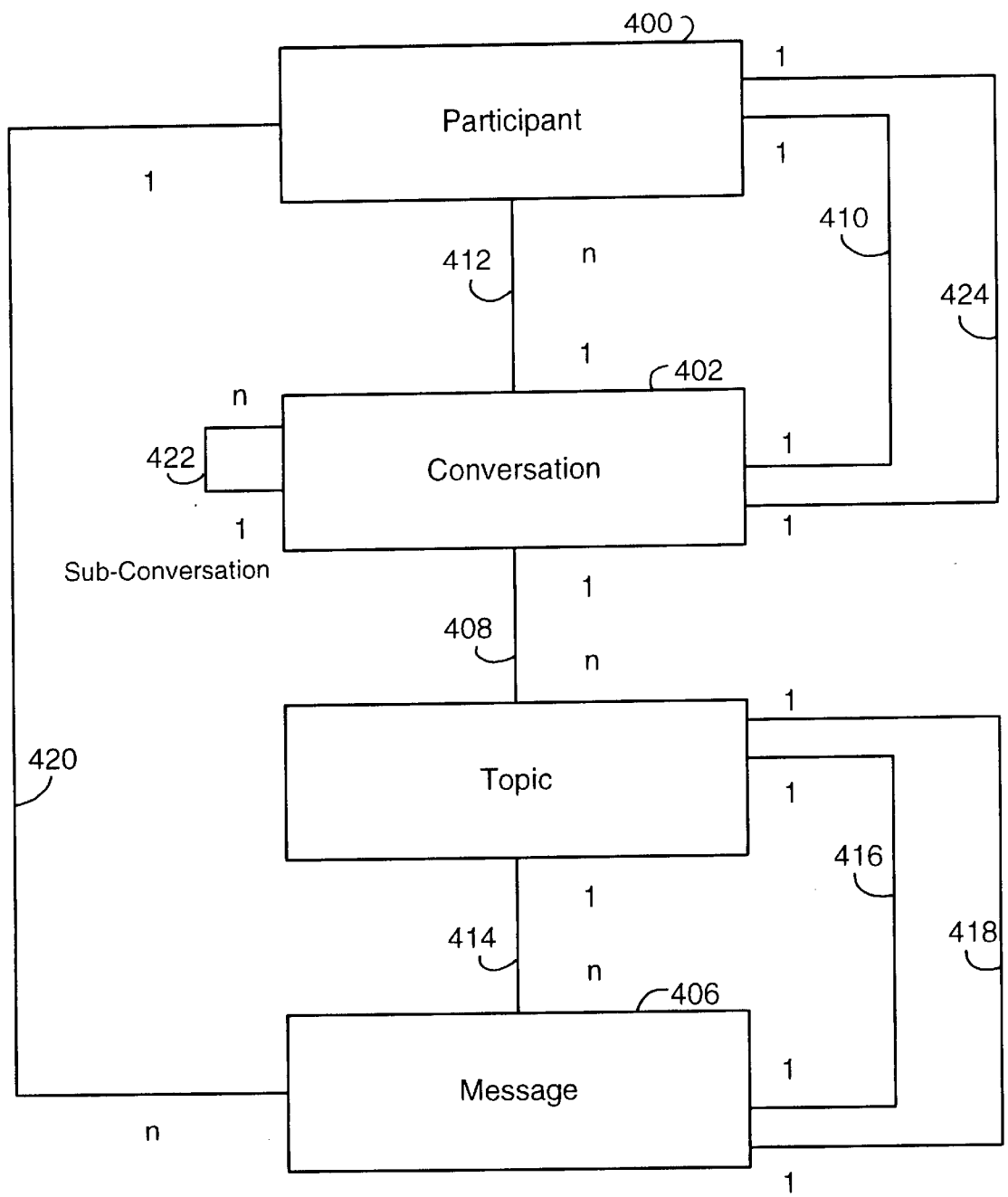
FIG. 4 is an entity-relationship diagram showing relationships between various entities in a group conversation using a preferred embodiment of the present invention.

FIG. 4 is an entity-relationship diagram showing relationships between various entities in a group conversation using a preferred embodiment of the present invention. The entities shown are participant 400, conversation 402, topic 404, and message 406. A conversation 402 must have at least one topic 404 as shown in a relationship 408. For example, an online conversation 402 about organizing an office Christmas Party may have as topics 404 Dining Arrangements and Employee Gifts. Conversation 402 must also have one and only one initiator, who is also a participant in the conversation as shown in a relationship 410. For example, the initiator of conversation Christmas Party may be the person who is responsible for organizing the party. Christmas party conversation 402, while having at least one participant who is the initiator, will very likely have other participants. Using the same example, the Christmas party committee may have seven other members, who are all participants in the conversation. This is shown as a relationship 412.

A topic 404 has one or more messages sent among the participants regarding that topic as shown in a relationship 414. The topic is associated with a conversation as shown by a relationship 408. A topic, such as Dining Arrangements associated with the Christmas party conversation 402, has one initiator and one terminator shown by relationships 416 and 418, respectively. Thus, within a conversation, topics may be independently initiated and terminated without terminating the conversation itself. In a preferred embodiment, only the initiator of a conversation can initiate a topic within that conversation. Thus, only the person responsible for organizing the party can create topics within the conversation. Similarly, only the initiator of the conversation can terminate the conversation, and is the only one who can terminate topics within that conversation. A participant 400, such as a member of the party organizing committee can send one or more messages 406 regarding a particular topic 404. This is shown as a relationship 420.

In addition, a conversation 400 can have one or more sub-conversations in which a sub-set of participants in conversation 402 may participate. This is shown in a relationship 422. For example, if three participants in the Christmas party conversation 402 are responsible for the party budget, one of those participants (who does not have to be the initiator of the Christmas party conversation 402) can initiate a sub-conversation in which only those three participants can participate. A sub-conversation can have all the properties of conversation 402 including topics, messages, participants (necessarily a sub-set of participants in the parent conversation), and sub-conversations. A sub-conversation allows a sub-set of participants in a conversation to huddle and have an ongoing private discussion without other participants in the parent conversation knowing that they are having the sub-conversation. As mentioned above, any participant in a conversation 402 can initiate a sub-conversation. That same initiator is the only participant who can terminate the sub-conversation. Only the initiator of a conversation can create new topics within that conversation and is the only one who can terminate a conversation as shown in a relationship 424.

A preferred embodiment of the group messaging scheme of the present invention takes advantage of the MIME format for e-mail messages as described with respect to FIGS. 3a and 3b. A group message is an Internet e-mail message having specific characteristics manifested through a series of headers. A group messaging e-mail of the present invention may have as Content-Type 308 an experimental conversation subtype expressed as "x-conversation" type. Other tags (a tag being a "field" in a MIME Header such as items 306, 308, and 310 of header 304 in FIG. 3) describing the context of a group messaging conversation can include "x-conversation-name," "x-conversation-topic," "x-conversation-ID," and "x-initiator-token." "X-conversation-name" and "x-conversation-topic" are simply the names of a conversation and a topic as defined by the initiator of the conversation. "X-conversation-ID" is a globally unique conversation identification used to prevent collisions between conversation names and "x-initiator-token" is an initiator's e-mail address encrypted with the initiator's private key used to prevent participants from fraudulently posing as the initiator. These tags and the tag "x-conversation-action" discussed below, collectively define a client interaction protocol of a preferred embodiment of the present invention. The names of the tags may evolve to names without an "x-" prefix without effecting or negating any of the previous or following descriptions.

Tag "x-conversation-action" describe common interactions among participants in a conversation and can be expanded to include other interactions as they arise. They include: initiating a conversation (i.e. sending invites); responding to an invitation; sending a message in a conversation; initiating a topic in a conversation; initiating a sub-conversation; and terminating a topic, sub-conversation, or conversation; adding a late participant; dropping a current participant; and allowing late participant to catch up on conversation history. Some of these interactions have restrictions with regard to what certain participants are authorized to do. For example, in a preferred embodiment only an initiator of a conversation can initiate a topic within that conversation or can terminate a conversation. However, any participant can initiate a sub-conversation within a conversation. Only an initiator of a topic, also the initiator of the conversation as defined by the protocol, may terminate a topic. These interactions and restrictions are equally applicable to entities and relationships in sub-conversations.

Figure 5A:
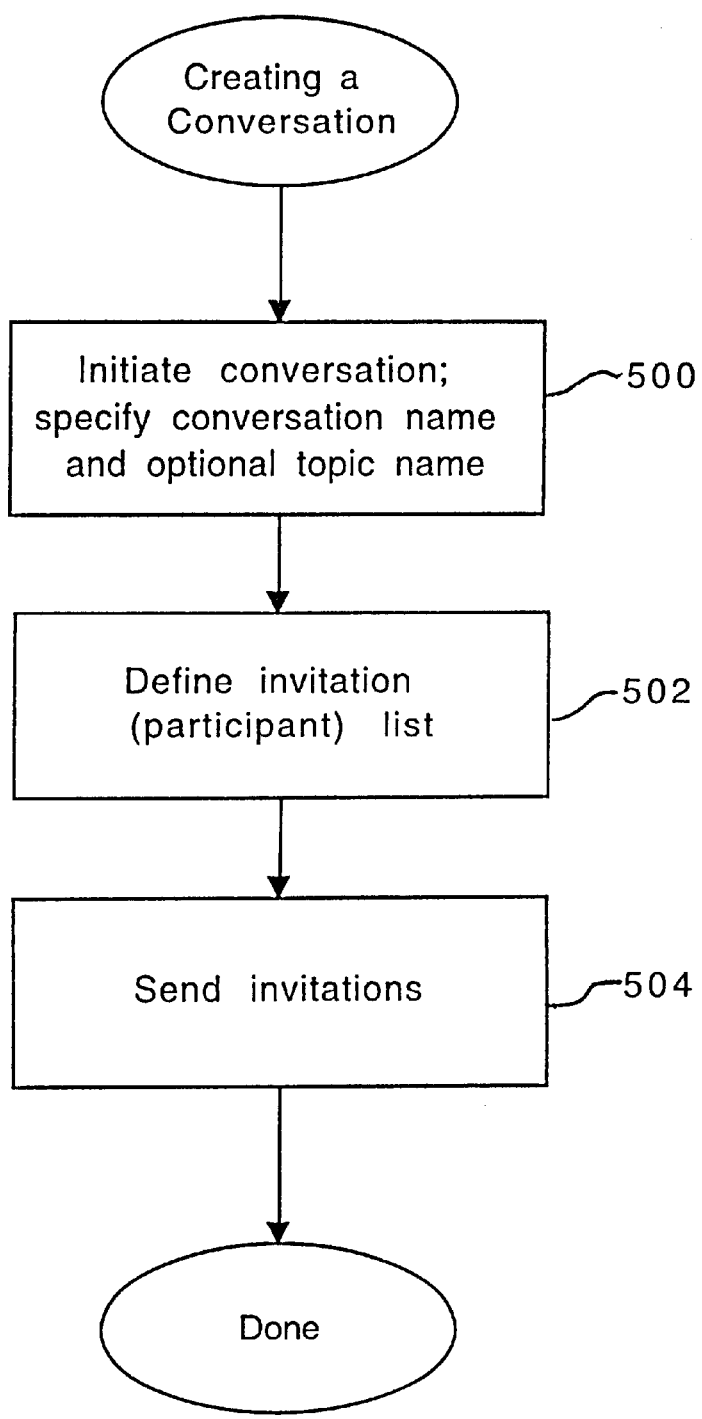
FIG. 5a is a flow diagram describing actions for creating a conversation in a preferred embodiment of the present invention.

FIG. 5a is a flow diagram describing actions for creating a conversation in a preferred embodiment of the present invention. At a step 500 a participant initiates a new conversation. This is done by the initiator specifying a locally unique conversation name and a topic name. These identifiers would be passed to tags x-conversation-name and x-conversation-topic, and an associated x-conversation-ID is created, all tags part of a MIME header 304 of FIG. 3a. The user interface component (see Group Messaging UI 912 of FIGS. 9a and 9b) of the application prompts the initiator for this information. This action is shown as relationship 410 and 408 of FIG. 4. At a step 502 the initiator decides who is going to participate in the conversation by defining an invitee or participant list. In a preferred embodiment, only the initiator of the conversation can decide who will be allowed to participate in a conversation. One way this is enforced is through the tag x-initiator-token, also within header 304, which contains the initiator's e-mail address encrypted. This list typically consist of the invitees' e-mail addresses. At a step 504 the initiator transmits the invitations via e-mail (in MIME format with the following conversation tags: x-conversation-invite) and waits for replies from the invitees. The action of creating a conversation is then complete. Steps 500 to 504 also describe creating a sub-conversation which has essentially the same features and restrictions as a regular conversation. The user interface of the application also allows the initiator to create topics within a conversation by specifying the name of a topic, similar to creating a conversation as described in step 500.

Figure 5B:
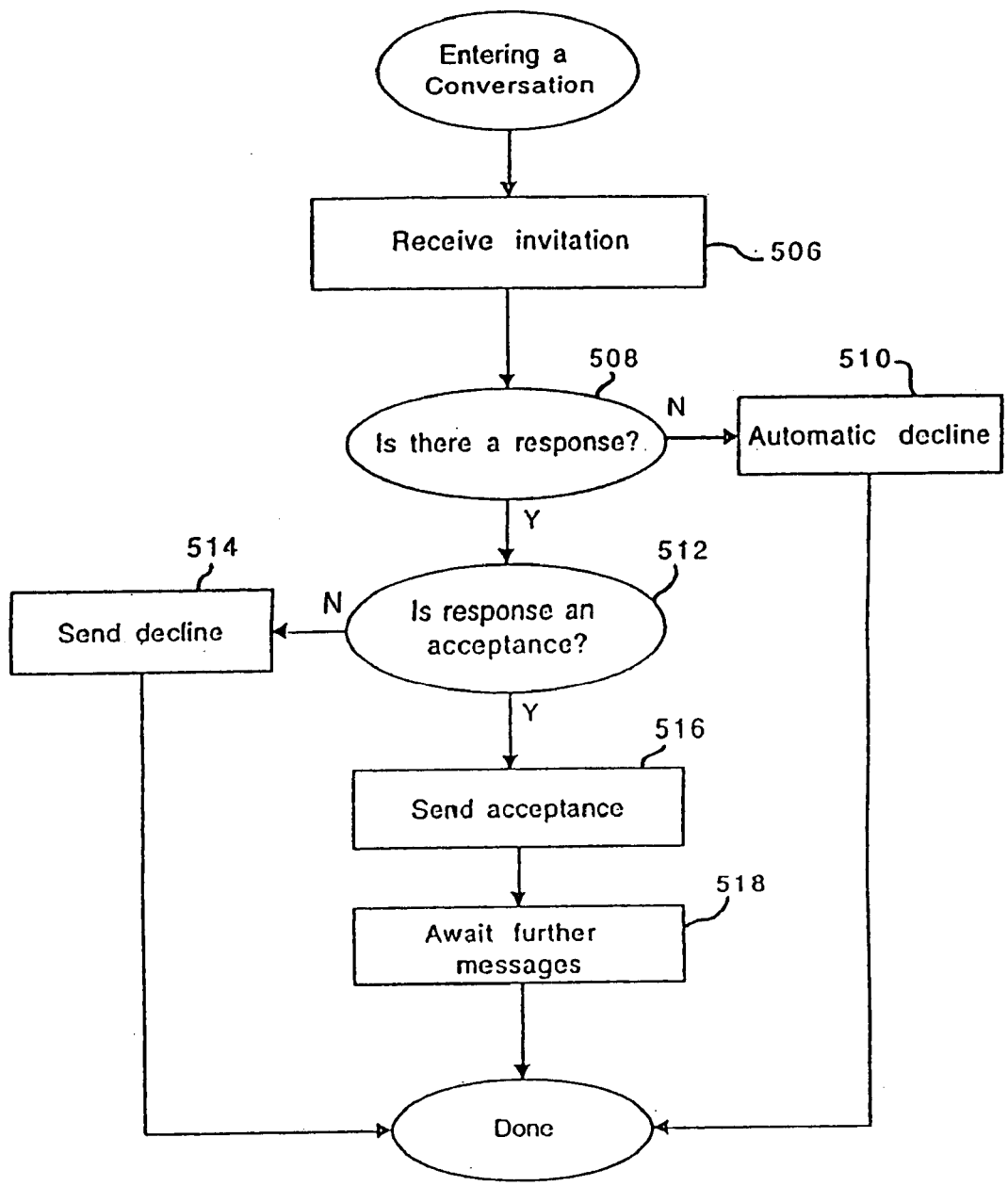
FIG. 5b is a flow diagram describing actions for entering a conversation in a preferred embodiment of the present invention.

FIG. 5b is a flow diagram describing actions for entering a conversation in a preferred embodiment of the present invention. At a step 506 a participant receives an invitation from an initiator to join a conversation. At a step 508 the application determines if there is a response from the invitee. If there is no response after a pre-determined amount of time, the application registers a time-out and an automatic decline from the invitee at a step 510, and the process is complete. If there is a response from the invitee, the application determines whether the response is an acceptance to join a conversation at a step 512. If the response is not an acceptance, the application registers an explicit decline from the invitee at a step 514 and the process is complete. If the application determines that the response is an acceptance, it sends the good news to the initiator at a step 516. At a step 518, the invitee waits for further messages from either the initiator or other participants in the conversation. At this stage the invitee can also begin sending messages as part of the conversation at step 518. The process of an invitee either accepting or declining a conversation is then complete. Acceptances and declines are indicated in MIME standard messages having the following conversation tags: x-invite-accept and x-invite-decline.

Figure 6:
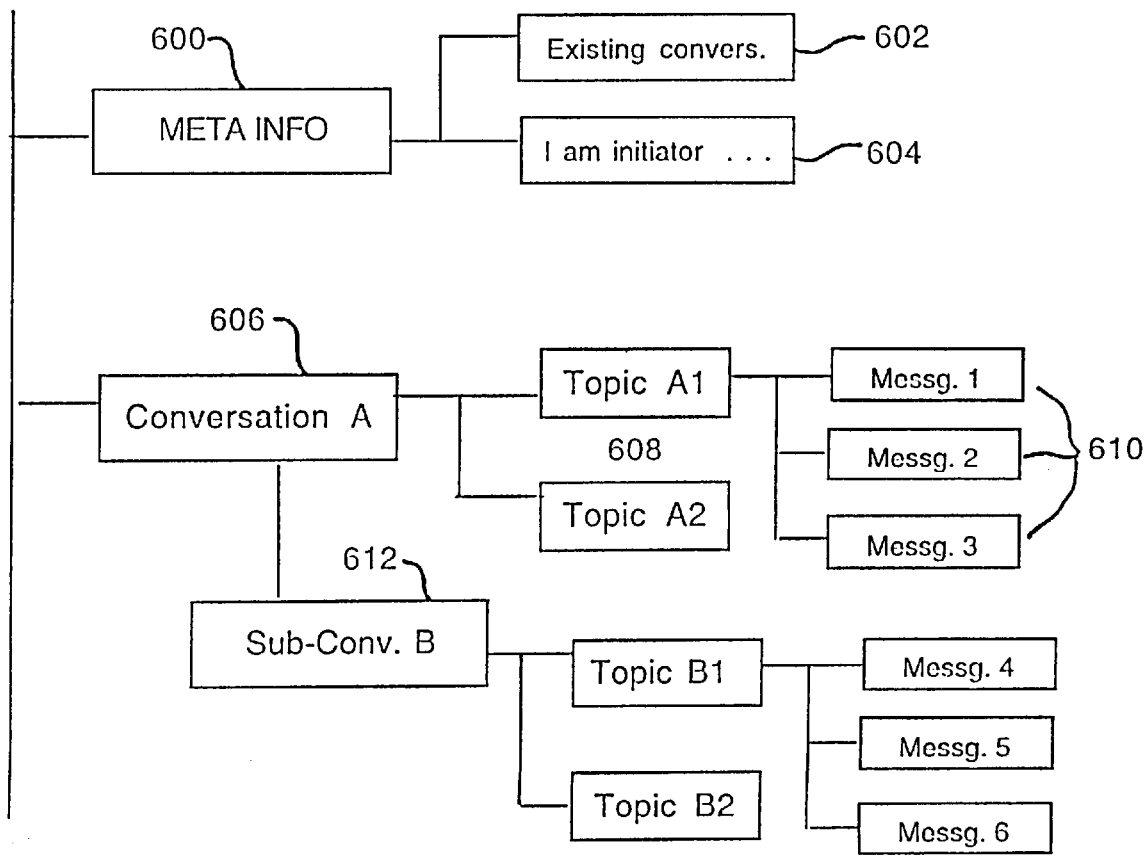
FIG. 6 is a schematic diagram showing the organization of conversations, topics and messages for a single participant.

FIG. 6 is a schematic diagram showing the organization (directory or file structure stored on the client machine) of conversations, topics and messages for a single participant. While the messages arranged according to this structure can reside at any appropriate storage locations on the client computer, such as memory 1004 and 1006 of FIG. 10. At the top of the structure is a branch 600 containing meta information on the particular participant. Examples of such information include a list of conversations 602 that the participant is part of including a list of initiators of each remaining conversation and a list of conversations 604 the participant initiated including a participant list of each conversation initiated by the participant. These and other types of general information is stored in a structure similar to information stored regarding conversations and topics discussed below so that is easily accessible. It is used, for example, with validation and authentication routines discussed below. Branches below branch 600 represent conversations and topics within a conversation. For example a branch 606 represents a conversation A having topics A1 to A3, each topic having zero, one or more messages. In this figure, topic A1 has three messages which can be stored according to size, chronology, or other category, deemed most useful to a particular participant. Information associated with each message informs the user of the history of the message and other useful information so that the participant knows as much as possible about the message. This feature, referred to as persistence, enforces the requirement that information such as what messages preceded the current message, participants involved, dates and times messages were sent, and under what conversations, sub-conversations, and topics they were sent, are all available to a participant in a conversation. This type of historical information behind each message is maintained at each client (i.e. participant) machine and is enforced by the persistence and structure (shown in FIG. 6) features of the present invention.

Figure 7A:
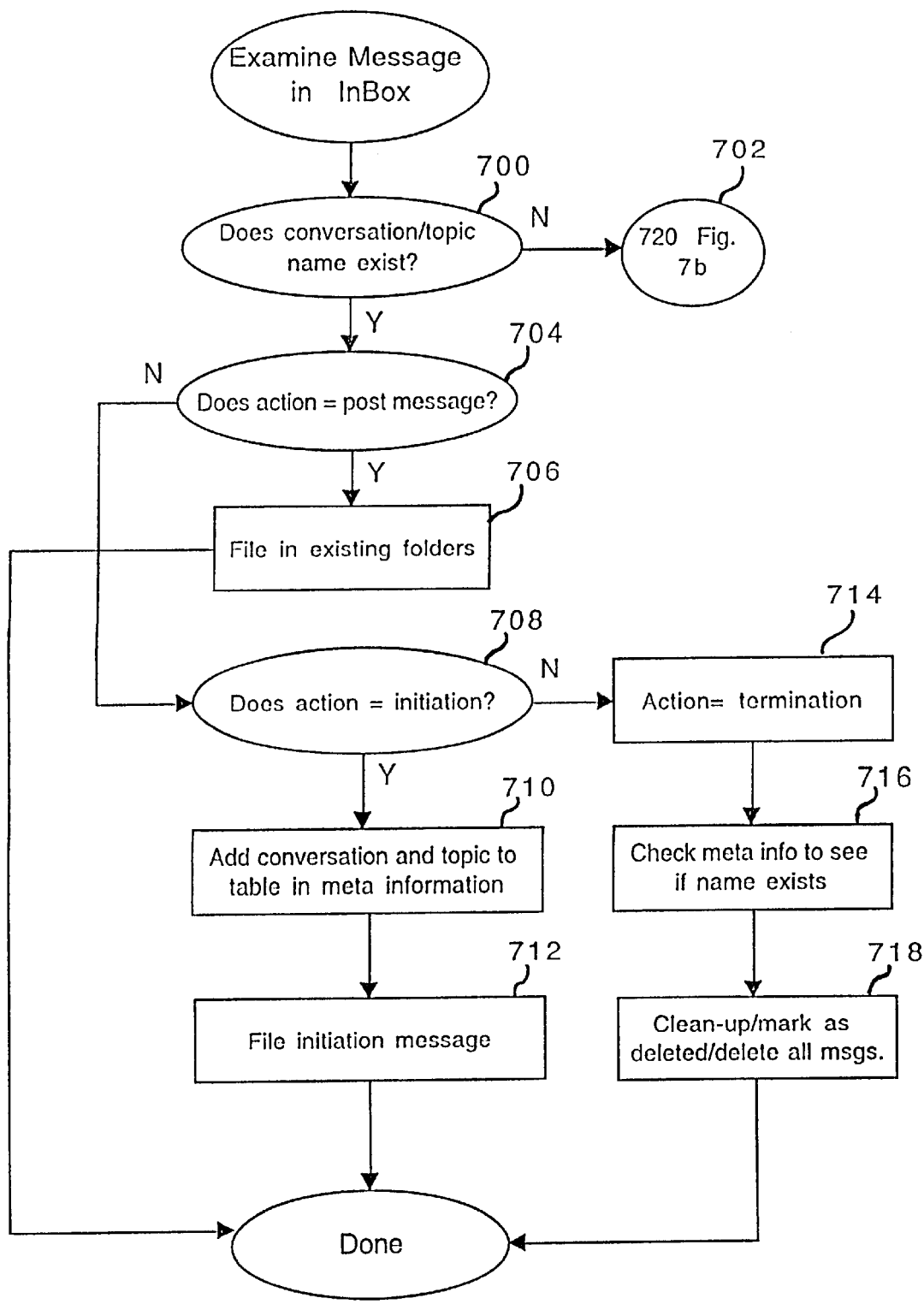
FIGS. 7a and 7b are flow diagrams describing the action of examining a message in an inbox of the present invention.

FIG. 7a is a flow diagram describing the action of examining a message in an inbox of the present invention. It describes processing of a message between receipt of a message, which occurs when the message is placed in the inbox, and delivery, which occurs when a message is opened by a participant. At a step 700, the application examines the appropriate fields of the message and determines whether a particular conversation name and topic name of the message being examined exists. This is one of the functions involved in general inbox housekeeping. If it determines that one of the names or both names do not exist, it proceeds to a step 702 where control continues with a step 720 of FIG. 7b, discussed below. If the application determines that both names are valid, it proceeds to a step 704. At step 704, the application begins evaluating the action being performed on the message by determining whether the action is posting the message to a participant's folders. If so, message is filed in a participant's existing folders at a step 706. The folders are described with respect to FIG. 6 which shows the organization of folders and how messages are stored based on conversation and topic name. Once the message is filed in an appropriate folder, the examination of that message is complete.

If the action is not posting of a message, the application continues evaluating the message at a step 708 where it determines whether the action is an initialization message. If so, the application proceeds to a step 710 where it adds the conversation name and topic name to the participant's meta information, described with respect to FIG. 6 at block 600 and appropriate lists thereunder, such as shown in block 602. At a step 712, the application files the initialization message in an existing folder and the process is complete. If the application determines at step 708 that the action being performed is not an initialization, it proceeds to a step 714 where it has determined, by elimination, that the action being performed is a termination function. At a step 716 the application checks the participant's meta information for the conversation name and topic name associated with the message and performs other housekeeping functions. It then begins the clean-up procedure by marking the message in the participant's file structure (shown in FIG. 6) as deleted. In a preferred embodiment the participant can choose to keep those messages for as long as necessary or can delete them to free space for new messages at a step 718. The process of examining a message in an inbox is then complete.

Figure 7B:
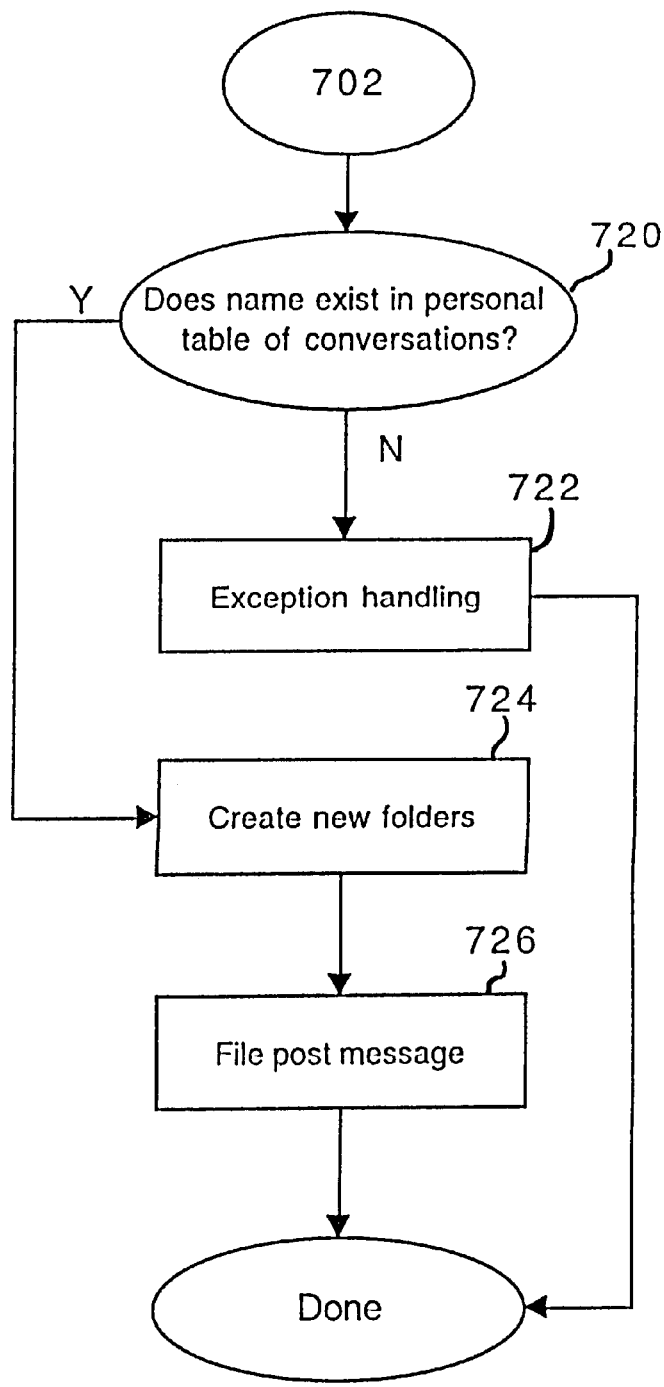

Returning to step 700, if the application determines that the conversation and topic names do not exist, the application determines whether the conversation name exists in the participant's personal table or list of conversations at a step 720 of FIG. 7b. If the application does not find the conversation name in the participant's list of conversations 602 located in the participant's meta information, it proceeds to a step 722. At step 722 the application performs functions necessary to handle exceptions, such as when a conversation or topic name does not exist yet a message associated with one of those names has been received. Once the exception handling is complete, the process is done. If the conversation name does exist in the participant's list of conversations 602, the application creates new folders at a step 724 to store the message and files the message at a step 726. Once the application files the messages, the process of examining a message in a mailbox is complete.

Figure 8:
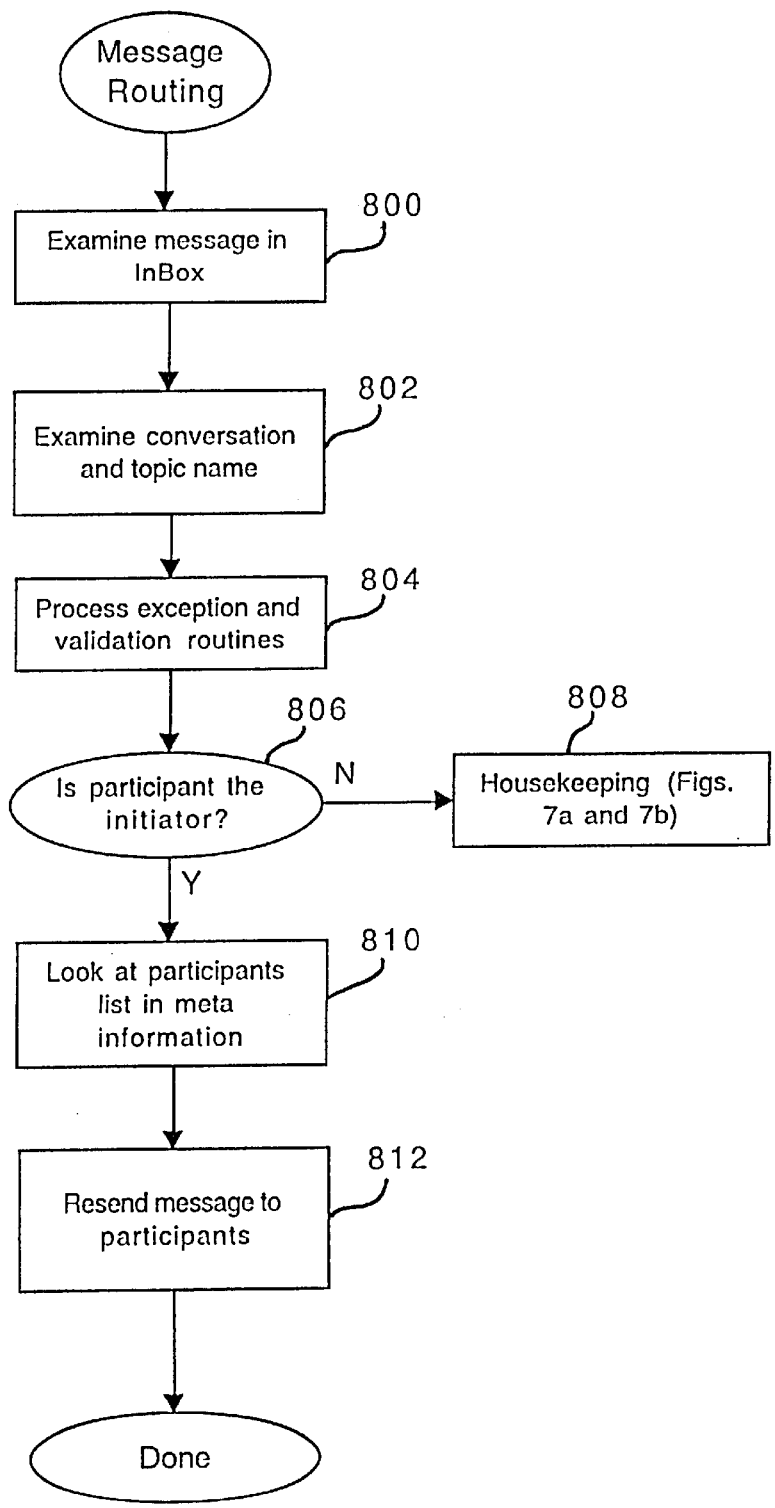
FIG. 8 is a flow diagram describing the actions of routing a conversation message in a preferred embodiment of the present invention.

FIG. 8 is a flow diagram describing the actions of routing a conversation message in a preferred embodiment of the present invention. Message routing essentially consists of the automatic filing of received messages or the resend of group messages, depending on the situation. At a step 800 the application examines the message stored in a participant's inbox or other mailbox. This step is described in detail with respect to FIGS. 7a and 7b above. Once the message has been examined, the application examines the conversation and topic name at a step 802. At a step 804 the application runs exception and validation routines and transmits an error message if it determines that the message is invalid or in error. At a step 806, the application determines whether the participant (i.e. the owner of the inbox) is the initiator of the conversation. If not, the application performs housekeeping routines described in FIGS. 7a and 7b at a step 808. These routines include naming directories, folders, and sub-folders according to conversation and topic.

If the application determines that the participant is the initiator, the application examines a list of participants in meta information folder 600 at a step 810. At a step 812, the application resends or mass mails the message to other participants in the ongoing conversation. This is done by placing the message in a queue in an outbox (which may be within or outside the mail user agent, discussed with respect to FIGS. 9a and 9b below) for the next batch send. This is done because in a preferred embodiment, all group messages from participants in the same conversation are first transmitted to the initiator of the conversation, who then transmits the message to other participants in the conversation. The initiator can act as a validator in the sense that it can ensure that the message belongs to an existing topic and is being sent to legitimate participants by using data in its meta information folder. This is done by inserting the e-mail addresses of the participants in the conversation into the message and sending the message to those participants. This also enforces the structure and persistence of the conversation (e.g. all participants are automatically copied on all messages). At this stage the message routing procedure is complete.

Figure 9A:
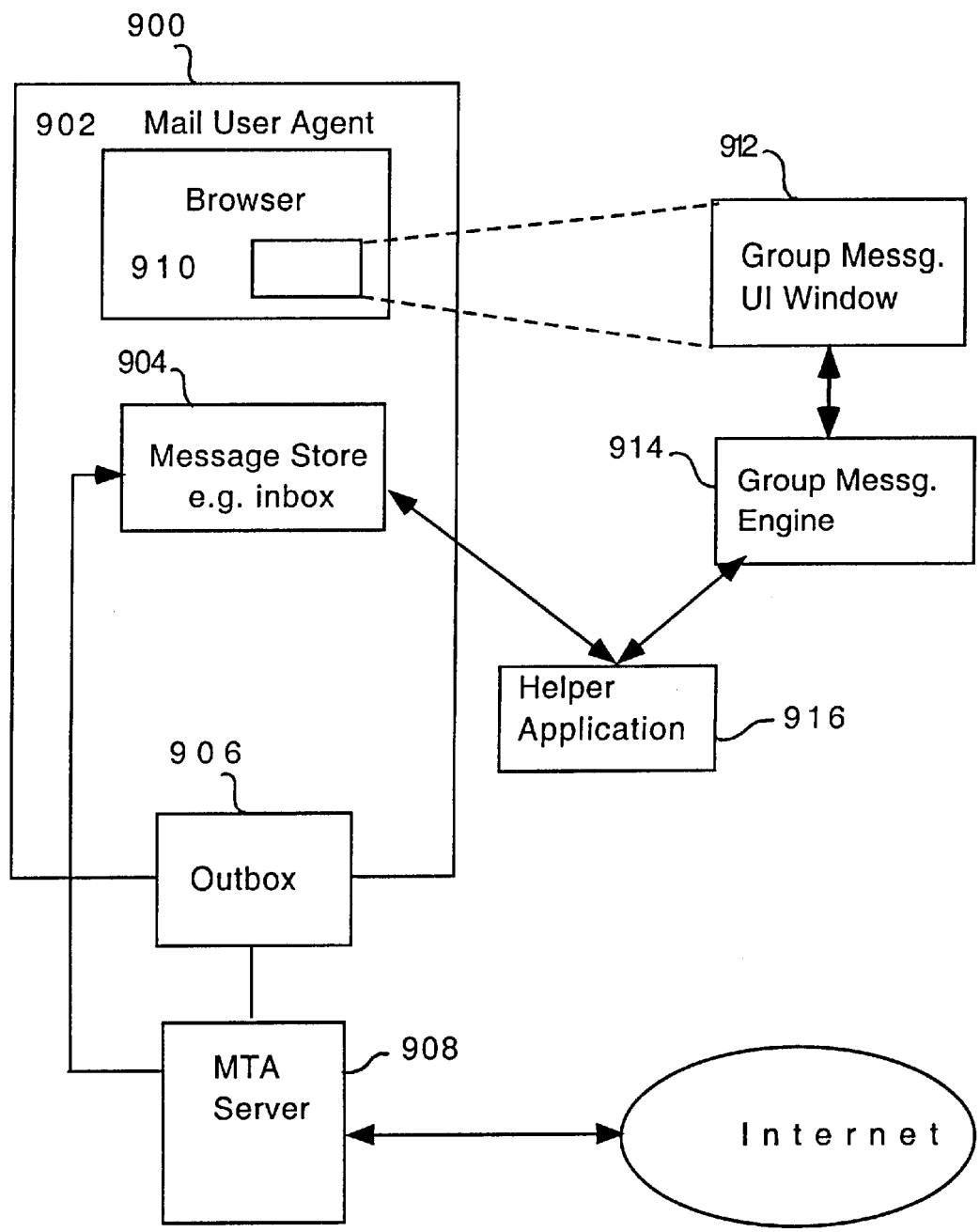
FIGS. 9a and 9b are block diagrams showing how a group messaging engine interacts with other components in the mail delivery system.

The structure, relationships, and functions of the present invention as described above comprise a group messaging engine. This engine is an important component or subsystem in a larger system for receiving and generally handling Internet e-mail messages. FIG. 9a is a block diagram showing how a group messaging engine interacts with other components in the mail delivery system. A mail user agent 900, resident on a client machine or server, contains an Internet browser 902 such as Netscape Navigator™ or Microsoft Internet Explorer™. It also contains a generic message store area 904, which includes, for example, an inbox and may also include an outbox 906. The outbox 906, as referred to with respect to FIG. 8 at step 812, may also reside between the mail user agent (MUA) and mail transfer agent (MTA), stores a queue of messages to be resent to all participants in a conversation. Outbox 906 sends its messages to a server 908, the MTA, that actually transmits the messages over the Internet. MTA 908 also receives messages from external sources, such as from other participants, and directs them to message store area 904.

In a preferred embodiment, browser 902 has a parallel window 910 that displays a user interface subsystem 912 of the group messaging application. User interface subsystem 912 operates in conjunction with actions performed on the inbox or message store 904. It can also enforce the client-interaction protocol, thereby preventing participants from attempting invalid or unauthorized functions. A group messaging engine 914 is invoked when certain commands are executed in browser 902, such as "Get New Messages" in Netscape Navigator™. More generally, it is invoked when tag Content-Type 308 of a MIME message as discussed with respect to FIGS. 3a and 3b equals the experimental "x-conversation." When an e-mail message using the MIME format has this content type, it is essentially handed off to group messaging system 914. Group messaging system 914 and message store 904 have a helper application 916 that is invoked when the content type of a MIME message is "x-conversation" type to assist in operations between message store 904 and group messaging engine 914.

Figure 9B:
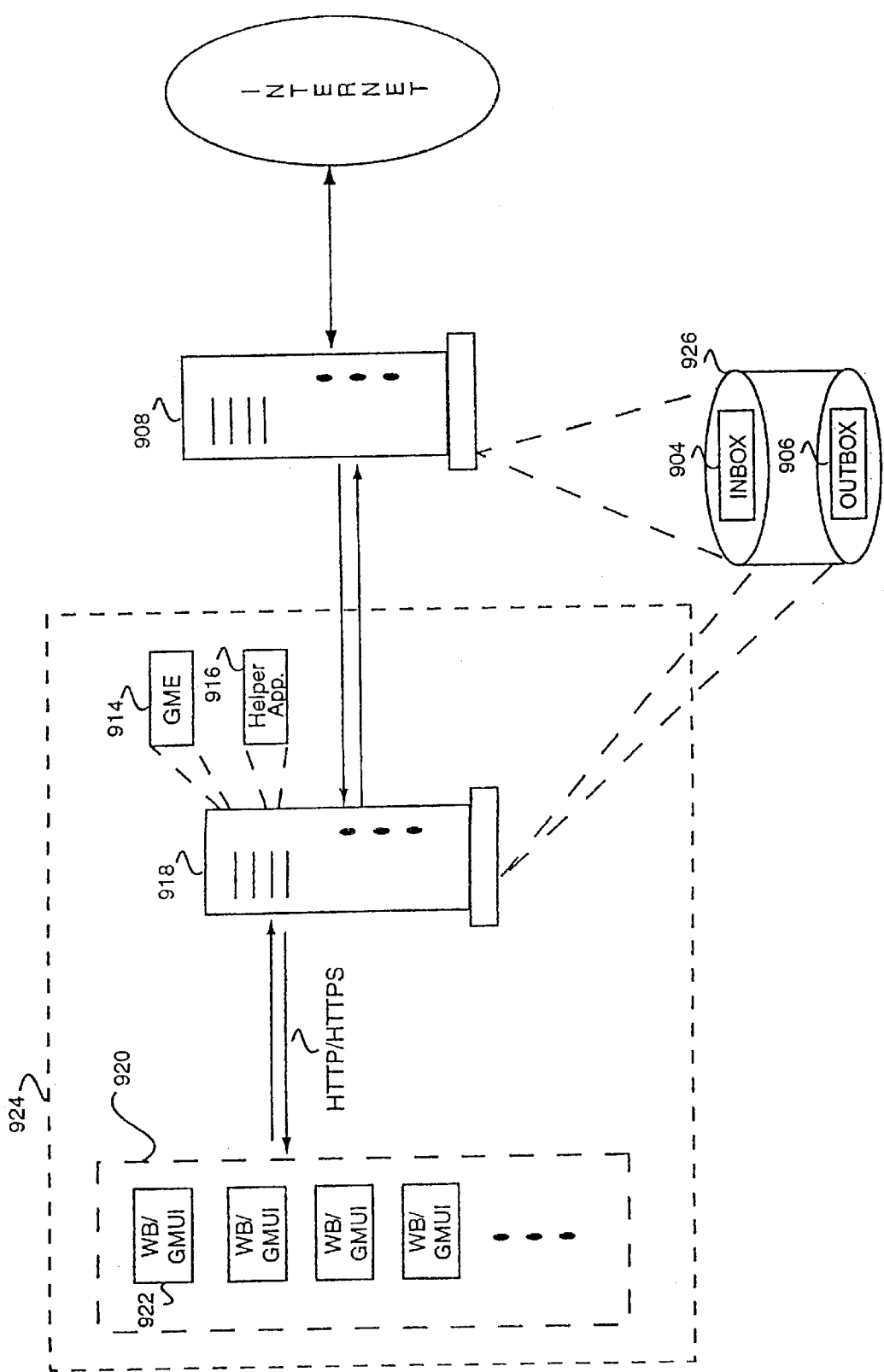

FIG. 9b is also a block diagram showing an alternative arrangement of the logical components of how a group messaging engine interacts with other components in the mail delivery system of the present invention. The arrangement of FIG. 9b includes a Web server 918 in addition to the MTA server 908, shown initially in FIG. 9a. Web server 918, which in FIG. 9b is shown on a dedicated server computer, is connected via HTTP or HTTPS (a secure version of HTTP) to multiple Web browsers 920. Other appropriate protocols, including both public and private, can be used in place of HTTP. In a preferred embodiment, each Web browser 922 also functions as a Group Messaging UI Window, shown as a sub-window 912 in FIG. 9a. In FIG. 9b, the Web browser is the Group Messaging UI Window, and is equivalent to a mail user agent 900 shown initially in FIG. 9a. Group Messaging Engine 914 and Helper Application 916 are extensions to Web server 918 and can be shared by Web browsers 920. As is known in the art, Web servers have extension mechanisms (e.g. NSAPI, ISAPI, CGI) that allow applications to extend from Web servers. In the arrangement shown in FIG. 9b, the multiple MUAs 920 and Web browser 918 collectively represent a virtual or super client 924 to MTA server 908.

Also shown in FIG. 9b are Inbox 904 and Outbox 906 stored on a memory storage area 926. Storage area 926 can be a separate storage area residing on a separate server and not on any of the MUAs 920, Web server 918, or MTA server 908. In a preferred embodiment, storage area 926 is easily accessible by or resides on MTA server 908. In another preferred embodiment, storage area resides on Web server 918. In yet another embodiment, it can reside on the individual MUAs. Logically, each MUA 922 is in control of its own Inbox 904 and Outbox 906. Finally, MTA server 908 is connected to the Internet or enterprise-wide Intranet.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 10:
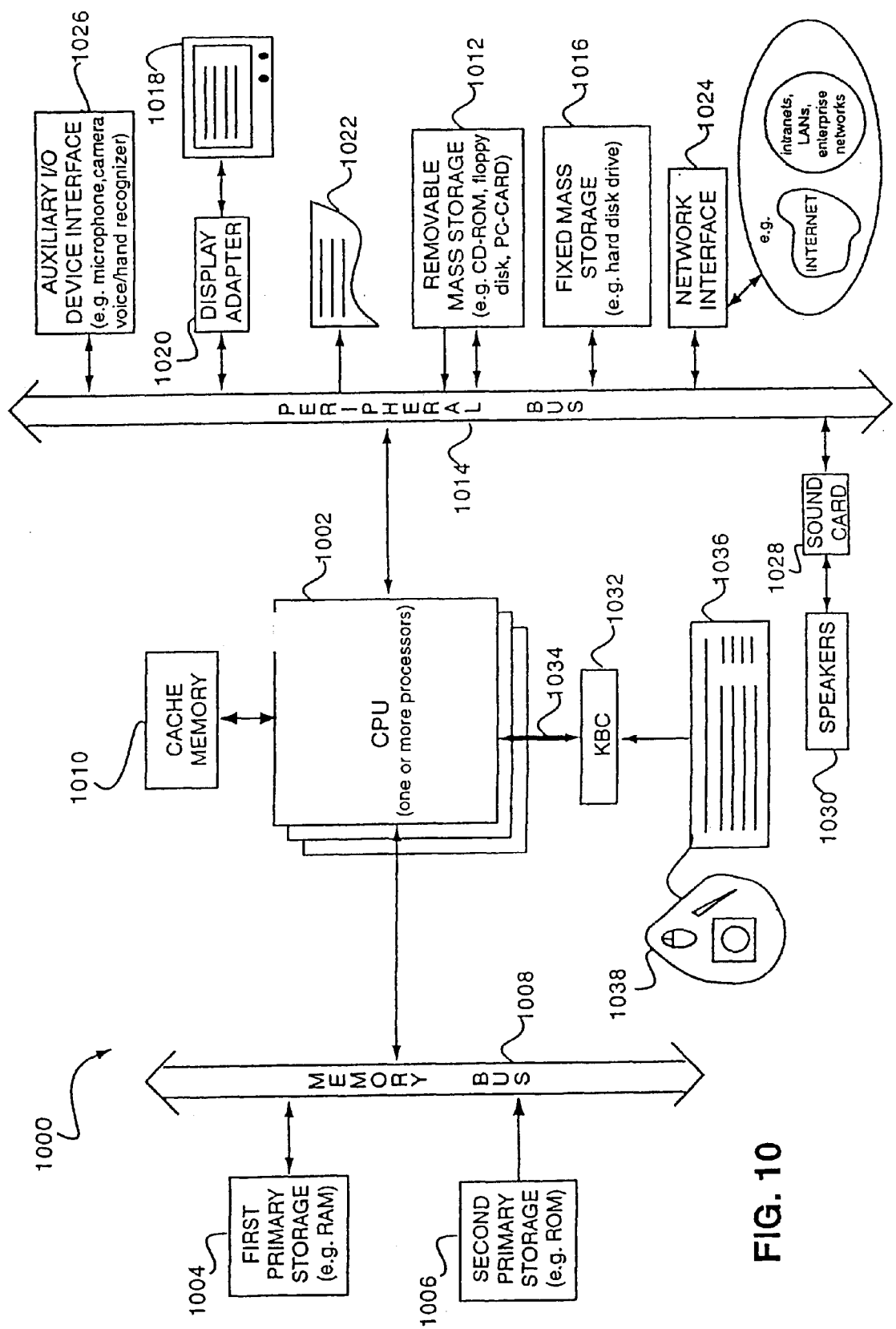
FIG. 10 is a schematic illustration of a general purpose computer system suitable for implementing the present invention.

FIG. 10 is a block diagram of a general purpose computer system 1000 suitable for carrying out the processing in accordance with one embodiment of the present invention. FIG. 10 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory, the CPU 1002 controls the reception and manipulation of input data, and the output and display of data on output devices.

CPU 1002 is coupled bi-directionally with a first primary storage 1004, typically a random access memory (RAM), and uni-directionally with a second primary storage area

1006, typically a read-only memory (ROM), via a memory bus 1008. As is well known in the art, primary storage 1004 can be used as a general storage area and as scratch-pad memory, and can also be used to store input data and processed data. It can also store programming instructions and data, in the form of a message store in addition to other data and instructions for processes operating on CPU 1002, and is used typically used for fast transfer of data and instructions in a bidirectional manner over the memory bus 1008. Also as well known in the art, primary storage 1006 typically includes basic operating instructions, program code, data and objects used by the CPU 1002 to perform its functions. Primary storage devices 1004 and 1006 may include any suitable computer-readable storage media, described below, depending on whether, for example, data access needs to be bi-directional or uni-directional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, PC-CARDS, portable mass storage devices, holographic storage devices, and other storage devices. A fixed mass storage 1016 also provides additional data storage capacity and is coupled bi-directionally to CPU 1002 via peripheral bus 1014. The most common example of mass storage 1016 is a hard disk drive. Generally, access to these media is slower than access to primary storages 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, or telecommunications network using a network connection as shown. Through the network interface 1024, it is contemplated that the CPU 1002 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1002 is a keyboard controller 1032 via a local bus 1034 for receiving input from a keyboard 1036 or a pointer device 1038, and sending decoded symbols from the keyboard 1036 or pointer device 1038 to the CPU 1002. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system shown in FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. For example, although the conversation messages are described as being transmitted over the Internet, they can also be transmitted over an internal, enterprise-wide Intranet using the MIME standard and HTTP. In another example, although the group messaging UI window can be a sub-window within a Web browser, the Web browser can itself be the group messaging UI window. In yet another example, a Web server and a series of Web browsers can collectively be a virtual client to an MTA server, instead of each MUA being connected separately to an MTA server. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What claimed is:

1. A method of conducting a synchronized conversation using electronic messages over a computer network and among a plurality of network clients on the computer network, said network clients being members of a defined group of conversation participants, wherein said messages are sent and received in a MIME format, and wherein messages are exchanged using at least one of SMTP, ESMTP, IMAP, POP, HTTP, HTTS and wherein the synchronized conversation is specified as a MIME Content-Type, and wherein the content of the message is included in one or more MIME body parts, and wherein the synchronized conversation messages include data in MIME-specific tags, or in one or more body parts of a MIME message, specifying at least one of the following actions:
initiate the conversation,
respond to an invitation,
post a conversation message to the conversation,
initiate a topic in the conversation,
initiate a sub-conversation within the conversation,
terminate the topic,
terminate the sub-conversation,
terminate the conversation,
invite a late participant,
delete an existing participant, and
provide a conversation history to the late participant, the method comprising:

a) sending and receiving conversation messages over the computer network, from and by a computer network client and without posting said conversation messages to a specially designated conference server, b) providing a group messaging engine means for synchronizing the conversation messages between all participants by
  i) automatically storing all messages in the conversation at the computer network client in a message store organized in a hierarchy according to conversation, sub-conversation and topic,
  ii) automatically directing all messages sent by the computer network client of a participant in a conversation to all members of the defined group of conversation participants,
  iii) automatically preventing a message sender who is not amongst the participants, from sending a message to the participants, in the context of the synchronized conversation, c) providing an application helper means for combining said group messaging engine with said network client, d) providing a computer-readable medium allowing a plurality of such messages to be stored in a message store organized in a hierarchy according to conversation, sub-conversation and topic, said messages stored in a format allowing dissemination to one or more participants joined in a conversation, whereby a spontaneous, synchronized conversation using electronic messages can be initiated and conducted by any user of a network client combined with said group messaging engine using said application helper means, without the significant cost and maintenance burden of a separate conferencing server, and whereby each such synchronized conversation can be spontaneously initiated by a user of said network client combined with said group messaging engine using said application helper means, without the need for intervention by or permission of, a user outside the defined group of participants, said user having special administrative privileges as an application administrator, and whereby the totality of messages comprising a synchronized conversation and its hierarchically structured sub-conversations and topics are automatically and methodically organized and stored in a hierarchically organized message store by conversation, sub-conversation and topic without the need for manual filing of messages in the synchronized conversation, or any further manual intervention other than the initial creation of the conversation or acceptance of invitation to join a synchronized conversation, and whereby synchronization takes place between message stores of all participants in a conversation, said synchronization being between a subset of said hierarchically organized message store, said subset containing all messages pertaining to said conversation, and corresponding subsets of hierarchically organized message stores on each participating network client, said corresponding subsets each containing all messages pertaining to said conversation, without the need for any other means for inter-client message storage synchronization, and whereby any sender of messages on said network, if not a member of said defined group of participants in a conversation, is automatically prevented from sending messages in the context of said conversation, which behavior when combined with the hierarchically organized synchronized message stores of participants, significantly increases the coherence of said conversation by preventing irrelevant and unsolicited messages and increasing the organization of the existing ones.

2. The method of claim 1, where said data in conversation message tags, placed in MIME-specific headers or in a body part of a MIME message, are comprised of:

a) a conversation header indicating the content of the message as a conversation, b) a conversation name tag containing the name of the conversation represented by the message, c) a unique conversation identifier tag containing a character string identifying the conversation, d) a conversation topic tag containing the name of a topic within the conversation and e) a conversation action header signaling one or more actions taken by a participant in the conversation;

where a combination of said conversation header, said conversation name tag, said unique conversation identifier tag, said conversation topic tag and said conversation action header define a context of the conversation represented by the message, including hierarchical relationship between conversation, sub-conversations and topic.

3. A computer-readable medium on which is stored the message as recited in claim 2, wherein the unique conversation identifier tag character string includes a conversation initiator address, conversation name, and a unique message identifier string.

4. The method of claim 1 where the network client is an Internet web browser.

5. The method of claim 1 the method comprising:
 a) initiating a conversation by sending an invitation message to each participant in a first group of participants,
 b) receiving an acceptance message from each participant in a second group of participants where the second group is either the same as the first group of participants or is a sub-set of the first group of participants, thereby
 c) creating a conversation represented by a conversation structure, said conversation structure having a domain of participants defined as the second group of participants, having as a creator the recipient of the acceptance message from each participant in the second group of participants, and
 d) accessing said conversation structure stored on a client machine, said client machine normally accessible by one of said participants in the second group of participants.

6. The method of claim 5, further including creating a topic within the conversation, said topic having a creator, where said creator of said topic can only be the sender of the invitation message from each participant in the second group.

7. The method of claim 6, further including methodically storing, in the conversation structure, one or more topics within a conversation.

8. The method of claim 5, further including methodically storing in the conversation structure general conversation meta information for a particular participant, including
 a) information uniquely identifying conversations which said participant has initiated, and
 b) information uniquely identifying conversations of which participant is a member but is not the initiator,
such that, said conversation structure, that stores said general conversation information for said particular participant, resides on the client machine of said particular participant.

* * * * *